(12) United States Patent
Kita et al.

(10) Patent No.: US 9,651,836 B2
(45) Date of Patent: May 16, 2017

(54) DISPLAY DEVICE

(71) Applicant: Panasonic Liquid Crystal Display Co., Ltd., Himeji-shi, Hyogo (JP)

(72) Inventors: Kazuo Kita, Osaka (JP); Ryutaro Oke, Osaka (JP); Genshiro Kawachi, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 14/191,041

(22) Filed: Feb. 26, 2014

(65) Prior Publication Data

US 2015/0116618 A1    Apr. 30, 2015

(30) Foreign Application Priority Data

Oct. 28, 2013   (JP) .................. 2013-223712

(51) Int. Cl.
*G02F 1/1345* (2006.01)

(52) U.S. Cl.
CPC ........ *G02F 1/13458* (2013.01); *G02F 1/1345* (2013.01)

(58) Field of Classification Search
CPC ......... G02F 1/136286; G02F 1/136227; G02F 1/13306; G02F 1/13458; G02F 1/1345
See application file for complete search history.

(56) References Cited

U.S. PATENT DOCUMENTS

| | | | | |
|---|---|---|---|---|
| 5,835,177 A * | 11/1998 | Dohjo | ................... | G02F 1/1345 257/59 |
| 6,366,331 B1 * | 4/2002 | Sakamoto | ........... | G02F 1/13452 349/149 |
| 6,774,969 B2 * | 8/2004 | Ma | ........................ | G02F 1/1345 257/59 |
| 2003/0043331 A1 * | 3/2003 | Oowaki | .............. | G02F 1/13452 349/151 |
| 2006/0012744 A1 * | 1/2006 | Wang et al. | ................... | 349/151 |
| 2012/0105392 A1 * | 5/2012 | Nagami | ....................... | 345/204 |

FOREIGN PATENT DOCUMENTS

JP       2012-098464       5/2012

* cited by examiner

*Primary Examiner* — Edward Glick
*Assistant Examiner* — David Chung
(74) *Attorney, Agent, or Firm* — Hamre, Schumann, Mueller & Larson, P.C.

(57) ABSTRACT

A first substrate of a display device includes a plurality of signal lines which are arranged in an image display area and a plurality of driving circuits which drive the plurality of signal lines, the driving circuit is electrically connected to a metal line which is formed in the first substrate in an area of the first substrate overlapping the driving circuit in planar view, the metal line is electrically connected via a contact hole, in the area, to a lead-out line which is formed in a layer different from that of the metal line in the first substrate, the lead-out line is extended to the outside of the area and electrically connected to the signal line.

7 Claims, 12 Drawing Sheets

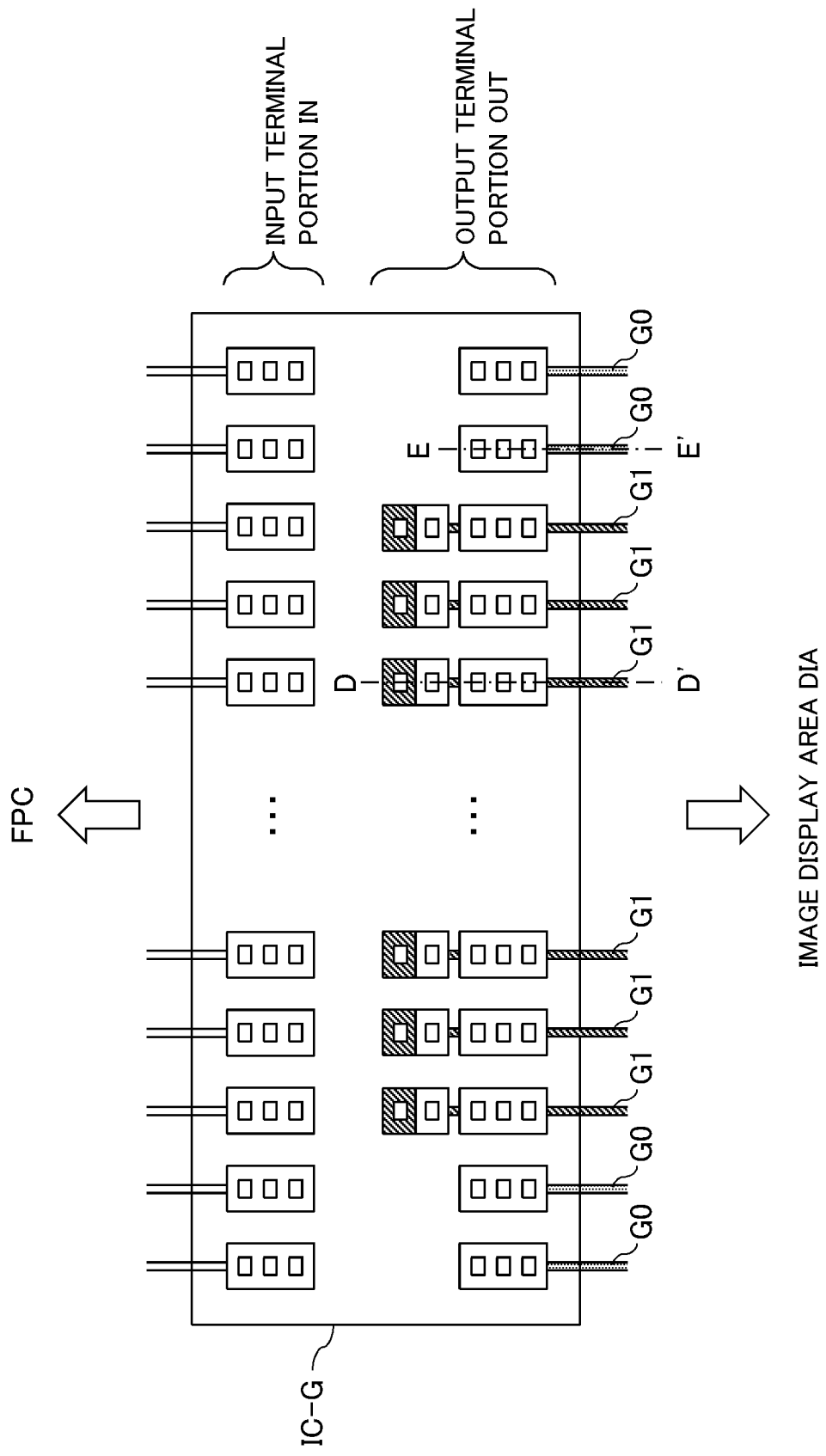

DISPLAY DEVICE

CROSS-REFERENCE TO RELATED APPLICATION

The present application claims priority from Japanese application JP 2013-223712 filed on Oct. 28, 2013, the content of which is hereby incorporated by reference into this application.

TECHNICAL FIELD

The present invention relates to a display device, and particularly to a connection structure of a driver IC.

BACKGROUND

In recent years, a mounting method known as a so-called chip on glass (COG) technology, in which a driving circuit (hereinafter, referred to as a driver IC) serving to drive a display panel is directly mounted on a glass substrate of the display panel, is employed in order for a display device to be formed smaller and thinner.

For example, Japanese Patent Application Laid-open No. 2012-98464 discloses a liquid crystal display device in which a driver IC serving to drive data lines and a driver IC serving to drive gate lines are directly mounted on a thin film transistor (TFT) substrate. In the liquid crystal display device, each driver IC is electrically connected to the data lines or the gate lines via lead-out lines which are connected to terminals of each driver IC.

SUMMARY

In the liquid crystal display device disclosed in Japanese Patent Application Laid-open No. 2012-98464, in a case where the lead-out lines and the signal lines (the data lines or the gate lines) are formed in layers different from each other, the lead-out lines and the signal lines are electrically connected to each other via contact holes. The area (contact area) of the contact holes is generally formed in a frame area surrounding an image display area of a liquid crystal panel. Therefore, in the related-art liquid crystal display device, the liquid crystal panel is hindered from being formed in a narrow frame due to the contact area which is necessarily formed for the electrical connection between the lead-out lines connected to the terminals of the driver IC and the signal lines driving the liquid crystal panel.

The invention has been made in view of the above problem, and an object thereof is to achieve a display panel which can be formed in a narrow frame.

In order to solve the above problem, a display device according to an embodiment of the invention includes a first substrate configured to be disposed on a rear surface side, and a second substrate configured to be disposed on a display screen side, in which the first substrate and the second substrate are arranged opposite to each other. The first substrate includes a plurality of signal lines which are arranged in an image display area and a plurality of driving circuits which drive the plurality of signal lines. The driving circuit is electrically connected to a metal line which is formed in the first substrate in an area of the first substrate overlapping the driving circuit in planar view. The metal line is electrically connected via a contact hole, in the area, to a lead-out line which is formed in a layer different from that of the metal line in the first substrate. The lead-out line is extended to the outside of the area and electrically connected to the signal line.

In the display device according to the embodiment of the invention, the metal line may be electrically connected to the lead-out line via a first contact hole which is formed in the area, and the driving circuit may be electrically connected to the metal line via a second contact hole which is formed in the area.

In the display device according to the embodiment of the invention, the metal line may be formed in the same layer as a data line which is included in the signal lines, and the lead-out line may be formed in the same layer as a gate line which is included in the signal lines.

In the display device according to the embodiment of the invention, the lead-out line may be formed on a glass substrate of the first substrate, a first insulating layer may be formed to cover the lead-out line, the metal line may be formed on the first insulating layer, a second insulating layer may be formed to cover the metal line, the first contact hole may be formed in the first insulating layer and the second insulating layer, the second contact hole may be formed in the second insulating layer, the metal line and the lead-out line may be electrically connected via a first transparent electrode which is formed in the first contact hole, and the metal line and the driving circuit may be electrically connected via a second transparent electrode which is formed in the second contact hole.

In the display device according to the embodiment of the invention, the first transparent electrode and the second transparent electrode may be covered with a resin adhesive to connect the driving circuit to the first substrate in the area.

In the display device according to the embodiment of the invention, the plurality of lead-out lines may be formed alternately in two layers which are different from each other, and an insulating layer may be formed between the lead-out lines which are adjacent to each other.

In the display device according to the embodiment of the invention, the second contact hole may be formed at a position near the image display area from the first contact hole.

BRIEF DESCRIPTION OF THE DRAWINGS

FIG. 9 is a plan view illustrating a configuration of a gate driver IC-G.

DETAILED DESCRIPTION

Embodiments of the invention will be described below using the drawings. In the embodiments of the invention, a liquid crystal display device will be given as an example, but a display device according to the invention is not limited to the liquid crystal display device. For example, the invention may be applied to an organic EL display device and the like.

Figure 1:
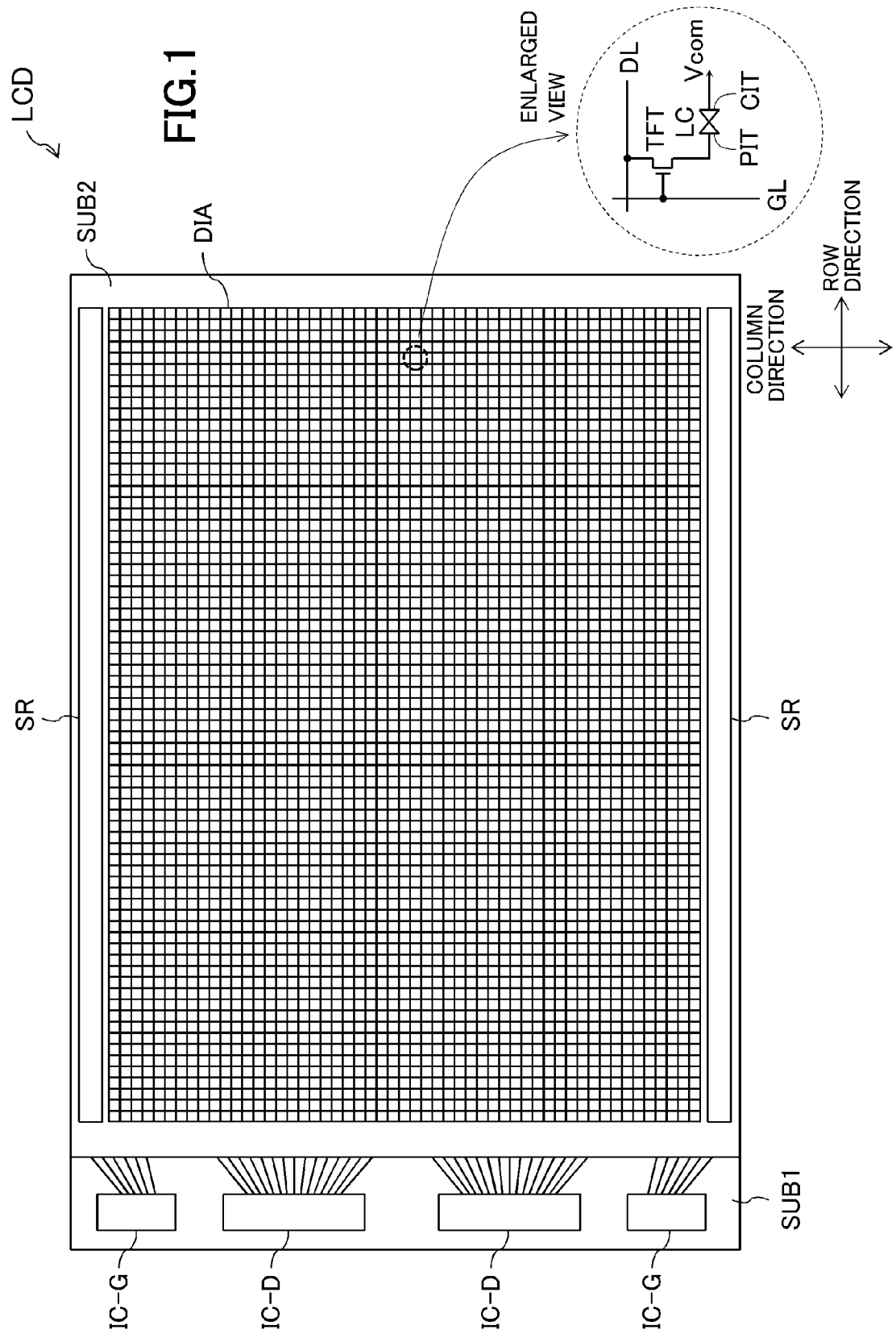
FIG. 1 is a plan view illustrating the entire configuration of a liquid crystal display device according to an embodiment of the invention.

FIG. 1 is a plan view illustrating the entire configuration of a liquid crystal display device according to the embodiment of the invention. A liquid crystal display device LCD includes, if roughly classified into functions, an image display area DIA and a frame area surrounding the image display area DIA.

In the image display area DIA, a plurality of pixel areas, each of which is surrounded by adjacent gate lines GL (signal lines) and adjacent data lines DL (signal lines), are arrayed in a matrix shape along a row direction and a column direction. Further, an extending direction of the gate line GL will be referred to as the column direction, and an extending direction of the data line DL will be referred to as the row direction.

In the frame area, a driver IC (gate drivers IC-G and data drivers IC-D) and shift registers SR are provided, which serve as a driving circuit to make an image displayed in the image display area DIA. Further, the liquid crystal display device LCD is manufactured by employing a COG technology in which the driver IC is directly mounted on a glass substrate of a TFT substrate SUB1 (a first substrate).

The driver IC includes a plurality of data drivers IC-D which drive the drive data lines DL and a plurality of gate drivers IC-G which drive the gate lines GL. Further, in FIG. 1, the data drivers IC-D and the gate drivers IC-G are arranged in a line along the column direction on a side (the left side) of the liquid crystal display device LCD, but the invention is not limited thereto. For example, the data drivers IC-D may be arranged in the column direction on the left side of the liquid crystal display device LCD, and the gate drivers IC-G may be arranged in the row direction on the upper side of the liquid crystal display device LCD.

The shift register SR is provided with a plurality of unit circuits (not illustrated) corresponding to the respective gate lines GL. The plurality of unit circuits are connected in cascade via a gate bus line (not illustrated).

A CF substrate SUB2 (a second substrate) is provided on a display screen side opposite to the TFT substrate SUB1. A liquid crystal layer LC is interposed between the TFT substrate SUB1 and the CF substrate SUB2. A backlight (not illustrated) is provided on a rear surface side of the TFT substrate SUB1 to irradiate a liquid crystal panel (a display panel) with light.

In each pixel area, an active matrix display is performed as follows. The gate driver IC-G supplies an output voltage to the gate bus line. The respective unit circuits of the shift register SR perform a shift operation based on the output voltage supplied via the gate bus line, so as to sequentially supply a gate voltage to the respective gate lines GL. The data driver IC-D supplies an output voltage (a data voltage) to the data line DL. While a thin film transistor TFT is turned ON/OFF by the gate voltage, the data voltage is supplied to a pixel electrode PIT. The data voltage supplied to the pixel electrode PIT is different from a common voltage supplied to a common electrode CIT from a common driver (not illustrated), due to which an electric field is generated to drive liquid crystal molecules of the liquid crystal layer LC. With the configuration, light is controlled in transmittance to display an image. In the case of a color display, it is realized by supplying desired data voltages to the data lines DL(R), DL(G), and DL(B) which are connected to the pixel electrodes PIT of the respective pixel areas corresponding to red (R), green (G), and blue (B) formed by a vertical stripe color filter. Further, the common electrode CIT may be formed in the TFT substrate SUB1, or may be formed in the CF substrate SUB2. The above display method is an example, and other well-known methods can be applied.

Herein, a specific structure for mounting the driver IC on the TFT substrate SUB1 will be described.

Figure 2:
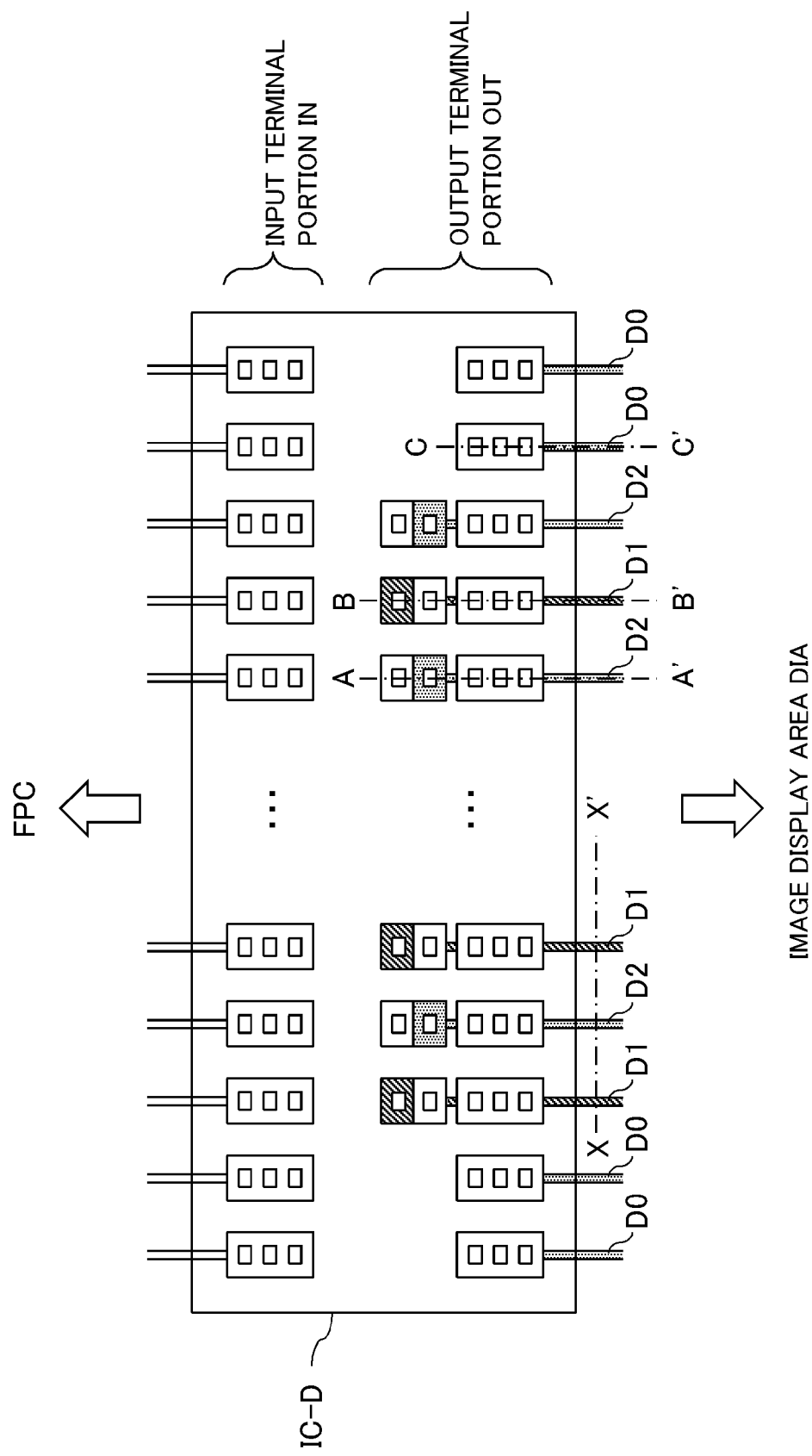
FIG. 2 is a plan view illustrating a configuration of a data driver IC-D.
Figure 3:
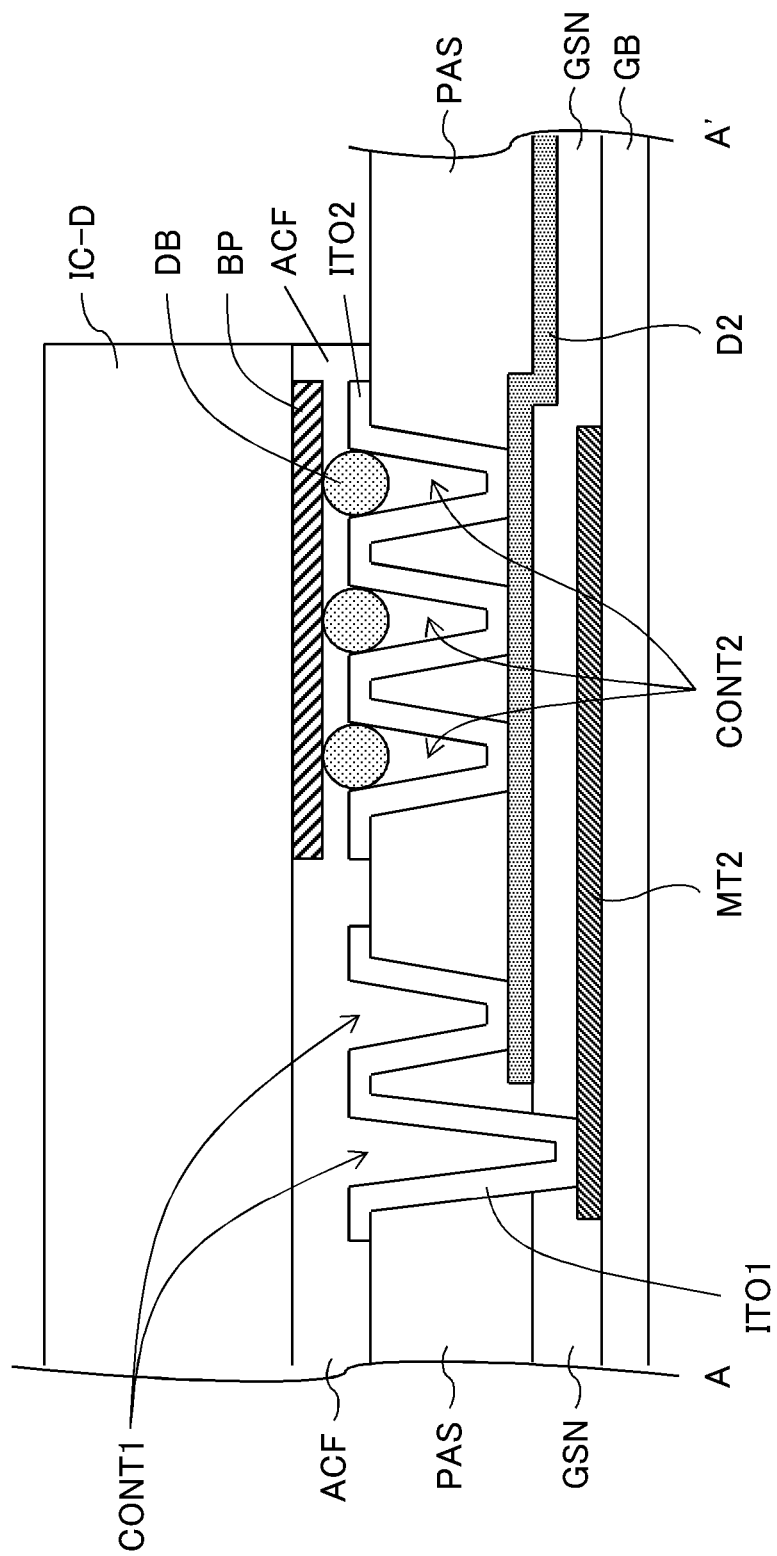
FIG. 3 is a cross-sectional view taken along Line A-A of FIG. 2.
Figure 4:
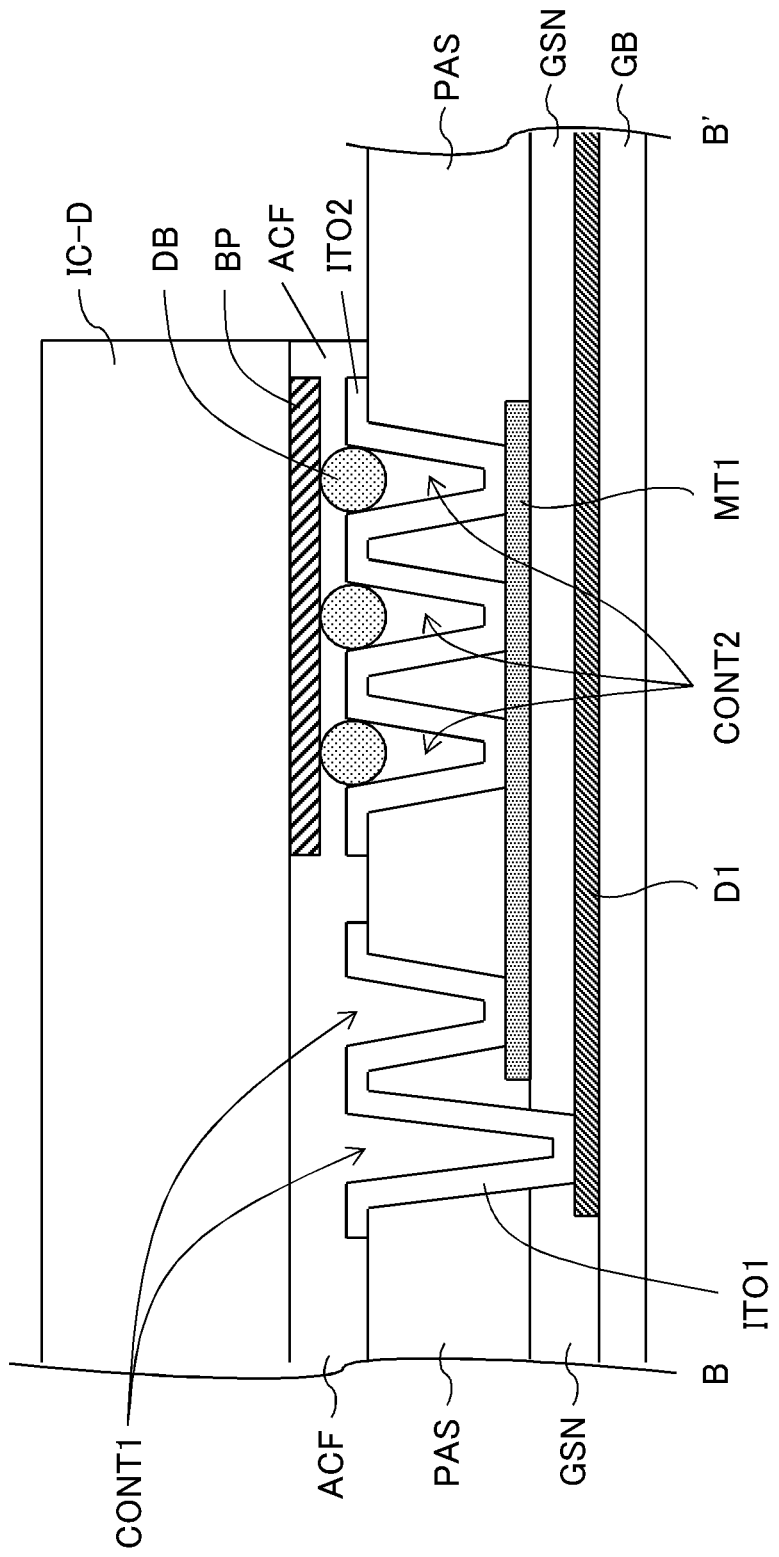
FIG. 4 is a cross-sectional view taken along Line B-B of FIG. 2.
Figure 5:
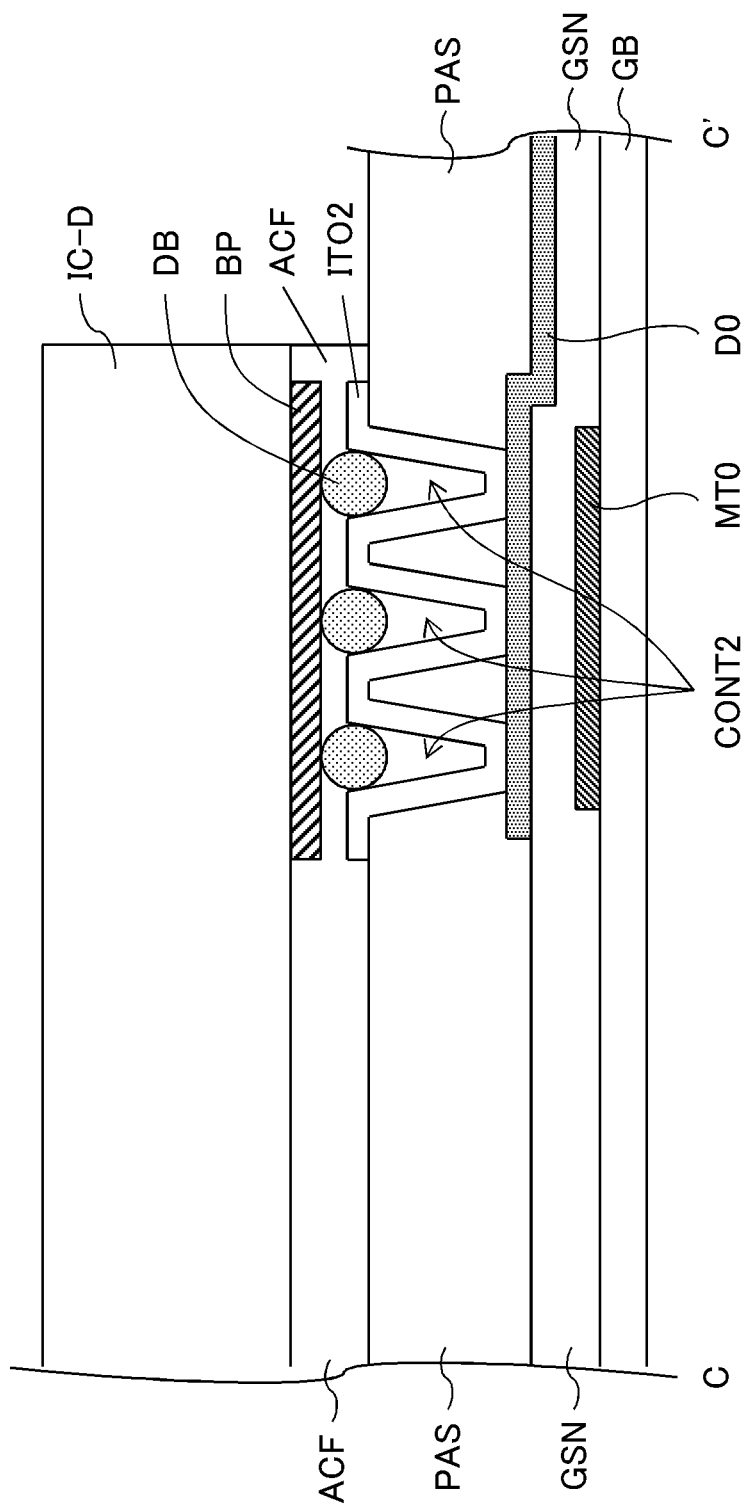
FIG. 5 is a cross-sectional view taken along Line C-C of FIG. 2.

FIG. 2 is a plan view illustrating a configuration of a data driver IC-D. FIG. 3 is a cross-sectional view taken along Line A-A of FIG. 2. FIG. 4 is a cross-sectional view taken along Line B-B of FIG. 2. FIG. 5 is a cross-sectional view taken along Line C-C of FIG. 2.

As illustrated in FIG. 2, the data driver IC-D is provided with an input terminal portion IN and an output terminal portion OUT. The input terminal portion IN, for example, is connected to a flexible printed circuit (FPC). The output terminal portion OUT is connected to lead-out lines D0, D1, and D2. The lead-out lines D1 and D2 are electrically connected to the data lines DL in the outside of a mounting area (a projection area to the TFT substrate SUB1) of the data driver IC-D. The lead-out lines D1 and D2 each are electrically connected to one data line DL. The lead-out lines D1 and D2 and the data lines DL may be directly connected in the same layer, or may present in different layers and be connected via contact holes or metal lines.

The lead-out line D0, for example, is a grounding line which does not contribute to displaying. The lead-out line D1 and the lead-out line D2, which are electrically connected to the data line DL, are formed in layers different from each other. Specifically, the lead-out line D1 is formed in the same layer (a gate layer) as the gate line GL, and the lead-out line D2 is formed in the same layer (a drain layer) as the data line DL. An insulating layer GSN (a first insulating layer) (a gate insulating layer) is formed between the lead-out line D1 and the lead-out line D2.

Figure 6:
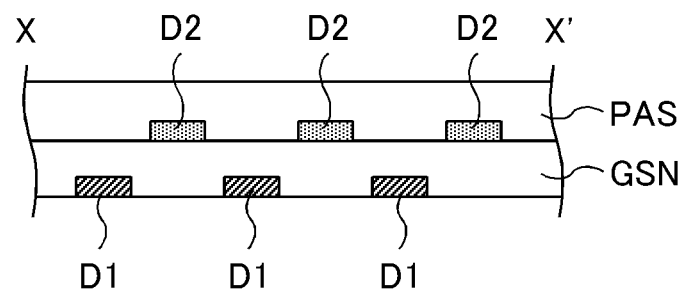
FIG. 6 is a cross-sectional view taken along Line X-X of FIG. 2.

The lead-out line D1 and the lead-out line D2 may be formed in the same layer, but these are preferably formed in layers different from each other. The reason is as follows. In other words, as illustrated in FIG. 1, the plurality of lead-out lines D are structurally bound in a bundle and connected to one data driver IC-D. Therefore, among the plurality of lead-out lines D, there are some lead-out lines D (inclined lines) of which the extending directions are inclined with respect to the extending direction (the row direction) of the data line DL. Ina case where the plurality of adjacent lead-out lines D are extended in the inclined direction, distances between these lead-out lines D become narrow, and thus there is a problem in that the adjacent lead-out lines are short-circuited or the lines made thin for preventing the short circuit are broken. For this reason, as illustrated in a cross-sectional view of FIG. 6, the lead-out line D1 and the lead-out line D2 are formed in layers different from each other with the insulating layer interposed therebetween.

Therefore, since the insulating layer (GSN) is interposed between the lead-out lines D1 and D2 which are adjacent in different layers, it is possible to prevent these lead-out lines D1 and D2 from being short-circuited. In addition, since the distances between the lead-out lines D1 and D1 (or the lead-out lines D2 and D2) which are adjacent to each other in the same layer are increased, it is possible to prevent these adjacent lead-out lines D1 and D1 (or the lead-out lines D2 and D2) from being short-circuited. Therefore, the lead-out line D1 and the lead-out line D2 are preferably formed in layers different from each other.

Next, a connection structure of the data driver IC-D will be described. First, a configuration of the output terminal portion OUT related to Cross Section A-A will be described using FIG. 3. In the TFT substrate SUB1, a metal line MT2 which is present in the same layer as the gate line GL is formed on a glass substrate GB. The insulating layer GSN is formed so as to cover the metal line MT2. The lead-out line D2 which is present in the same layer as the data line DL is formed on the insulating layer GSN. An insulating layer PAS (a second insulating layer) is formed so as to cover the lead-out line D2. While not illustrated in FIG. 3, the pixel electrode PIT is formed on the insulating layer PAS of the image display area DIA.

Under the data driver IC-D, that is, in an area (the projection area) of the TFT substrate SUB1 overlapping the data driver IC-D in planar view, a contact hole CONT1 (a first contact hole) is formed in the insulating layer GSN and the insulating layer PAS. A transparent electrode ITO1 (a first transparent electrode) is formed in the contact hole CONT1. With this contact hole, the lead-out line D2 and the metal line MT2 are electrically connected to each other.

In addition, a contact hole CONT2 (a second contact hole) is formed in the insulating layer PAS, and a transparent electrode ITO2 (a second transparent electrode) is formed in the contact hole CONT2. Parts of conductive particles DB contained in an anisotropy conductive film ACF (resin adhesive) come in contact with the transparent electrode ITO2, and a bump BP (for example, gold) of the data driver IC-D comes in contact with other parts of the conductive particles DB. With this configuration, the lead-out line D2 and the output terminal portion OUT of the data driver IC-D are electrically connected to each other. The lead-out line D2 stretches to the image display area DIA, and is electrically connected to the data line DL in the outside of the projection area.

Therefore, in the output terminal portion OUT of FIG. 3, the output voltage which is output from the data driver IC-D is supplied to the data line DL via the lead-out line D2. Further, the data driver IC-D and the TFT substrate SUB1 are connected by the anisotropy conductive film ACF. The transparent electrodes ITO1 and ITO2 are covered with a resin material of the anisotropy conductive film ACF in the projection area. Therefore, it is possible to prevent the transparent electrodes ITO1 and ITO2 from being corroded.

Next, a configuration of the output terminal portion OUT related to Cross Section B-B will be described using FIG. 4. A difference from the configuration of the output terminal portion OUT of FIG. 3 is that a metal line MT1 is formed to electrically connect the transparent electrodes ITO1 and ITO2 in the drain layer and the lead-out line D1 is formed in the gate layer and stretches to the image display area DIA. In the output terminal portion OUT of FIG. 4, the metal line MT1 and the output terminal portion OUT of the data driver IC-D are electrically connected via the transparent electrode ITO2 formed in the contact hole CONT2 and the conductive particles DB electrically connected thereto. In addition, the metal line MT1 and the lead-out line D1 are electrically connected via the transparent electrode ITO1 formed in the contact hole CONT1. Therefore, the lead-out line D1 and the output terminal portion OUT of the data driver IC-D are electrically connected. The lead-out line D1 stretches to the image display area DIA, and is electrically connected to the data line DL in the outside of the projection area. The lead-out line D1 and the data line DL may be connected via the contact hole, or may be connected via a metal line (ITO; Indium Tin Oxide) which covers the both lines.

Figure 7:
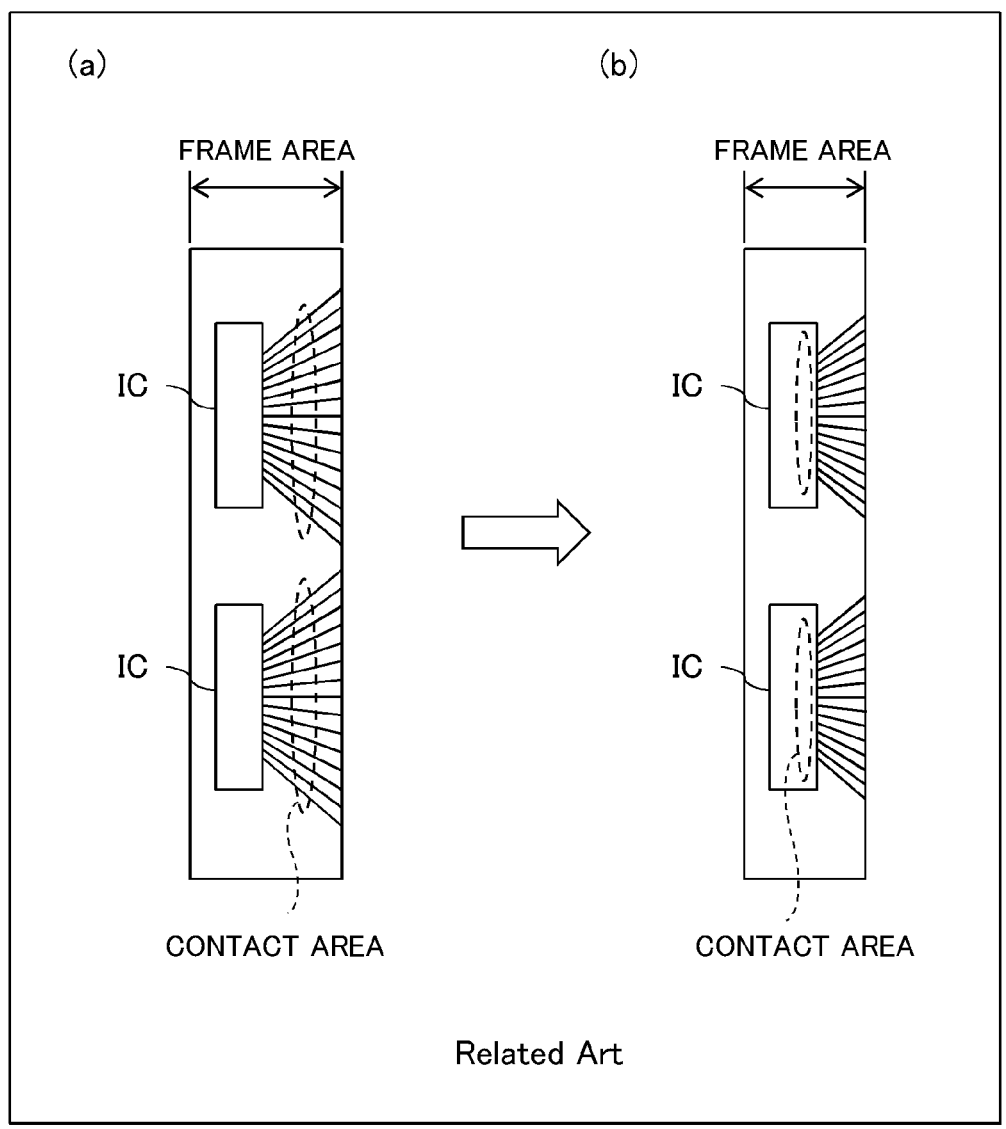
FIG. 7 is a plan view illustrating frame areas, in which (a) illustrates a related-art configuration and (b) illustrates a configuration of the embodiment.

In the configuration illustrated in FIG. 4, the contact hole CONT1 (a contact area) is provided under the data driver IC-D (in the projection area) to perform conversion (layer conversion) from the drain layer in which the metal line MT1 is formed to the gate layer in which the lead-out line D1 is formed. In other words, as illustrated in (b) of FIG. 7 in planar view, the contact area for the layer conversion is provided in the projection area of the data driver IC-D. Therefore, according to the liquid crystal display device LCD, the liquid crystal panel can be formed in a narrow frame compared to the liquid crystal display device (for example, see (a) of FIG. 7) in which the contact area is provided in the outside of the projection area of the data driver IC-D.

Further, the metal line MT2 of FIG. 3 and the lead-out line D1 of FIG. 4 are formed in the same layer and of the same material through the same process. In addition, the lead-out line D2 of FIG. 3 and the metal line MT1 of FIG. 4 are formed in the same layer and of the same material through the same process. In addition, though not contributing to the output voltage transfer, the metal line MT2 of FIG. 3 is provided to make the lead-out line D2 formed thereon flush with the metal line MT1 (see FIG. 4) formed in the adjacent area thereto.

In the output terminal portion OUT related to Cross Section C-C illustrated in FIG. 5, the lead-out line D0, for example, is a grounding line which does not contribute to displaying, so that there is no need to perform the layer conversion. Therefore, the contact hole CONT1 is not provided compared to the output terminal portion OUT illustrated in FIGS. 3 and 4. Similarly to the metal line MT2 of FIG. 3, a metal line MT0 is provided to make the lead-out lines D0 and D2 (see FIG. 3) flush with the metal line MT1 (see FIG. 4).

Further, the lead-out lines D0, D1, and D2 and the metal lines MT0, MT1, and MT2 can be formed with the same metal material.

Figure 8A:
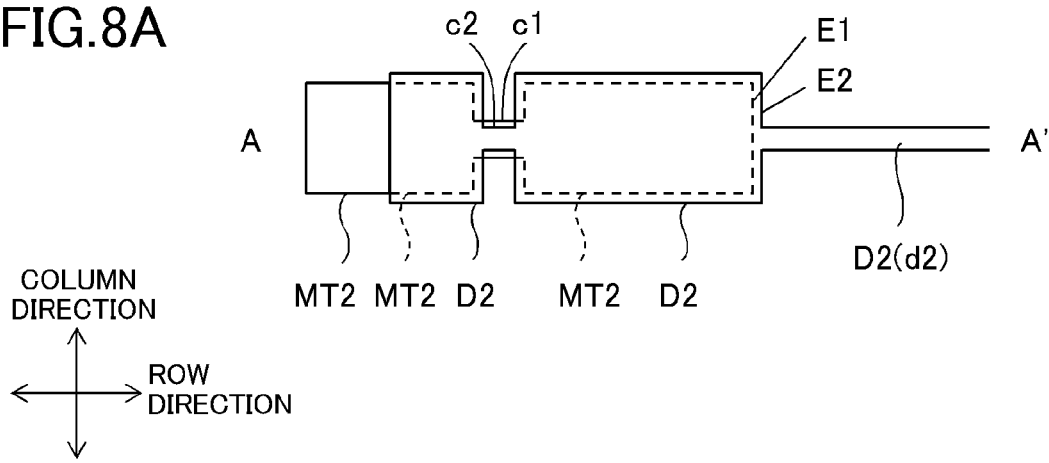
FIG. 8A is a plan view illustrating a configuration of an output terminal portion of FIG. 3.
Figure 8B:
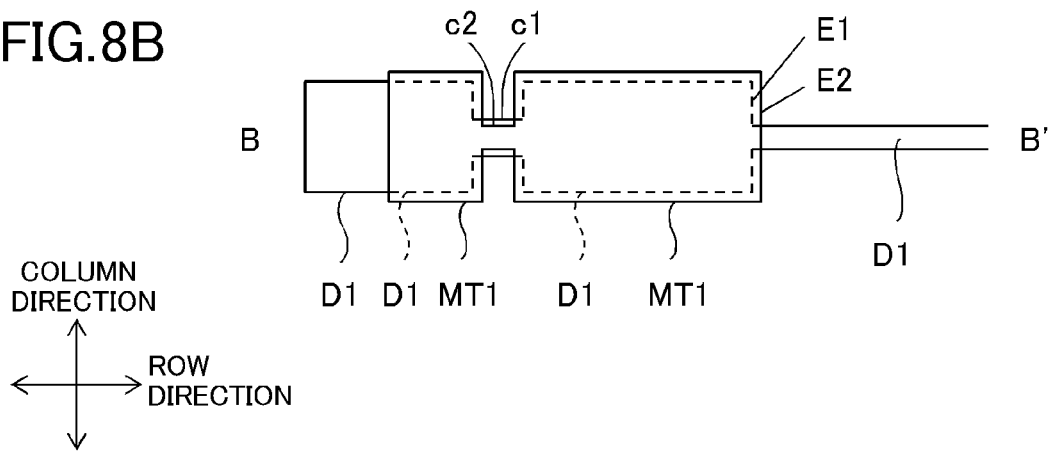
FIG. 8B is a plan view illustrating a configuration of an output terminal portion of FIG. 4.
Figure 8C:
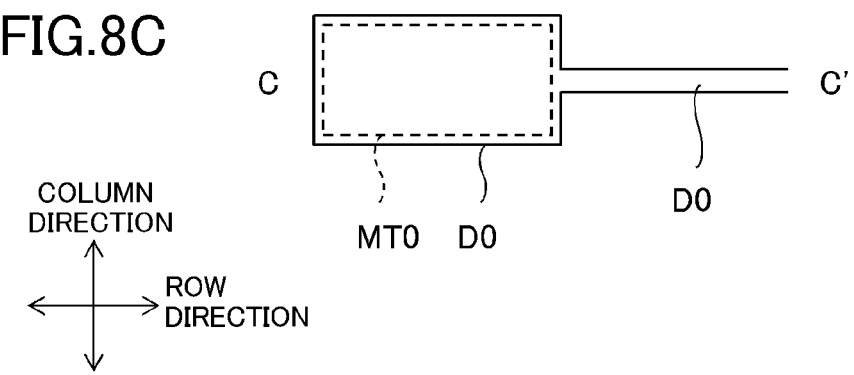
FIG. 8C is a plan view illustrating a configuration of an output terminal portion of FIG. 5.

Herein, a relation of widths of the lead-out lines D1 and D2 will be described. FIG. 8A is a plan view illustrating the lead-out line D2 and the metal line MT2 which correspond to the output terminal portion OUT related to Cross Section A-A illustrated in FIG. 3. FIG. 8B is a plan view illustrating the lead-out line D1 and the metal line MT1 which correspond to the output terminal portion OUT related to Cross Section B-B illustrated in FIG. 4. FIG. 8C is a plan view illustrating the lead-out line D0 and the metal line MT0 which correspond to the output terminal portion OUT related to Cross Section C-C illustrated in FIG. 5.

In FIG. 8A, when viewed from the data driver IC-D (upper side), the lead-out line D2 arranged on a near side is depicted with a solid line; a portion of the metal line MT2 which is arranged on a deep side to be overlapped with the lead-out line D2 is depicted with a dotted line, and a portion not to be overlapped with the lead-out line D2 is depicted with a solid line. The insulating layer GSN which is arranged between the lead-out line D2 and the metal line MT2 is not illustrated. As illustrated in FIG. 8A, an edge E2 of the lead-out line D2 covers an edge E1 of the metal line MT2. Therefore, it is possible to prevent a connection portion between an extending portion d2 of the lead-out line D2 and the edge E2 from being broken. In addition, a width of a coupling portion c1 of the metal line MT2 in the column direction is larger than that of a coupling portion c2 of the lead-out line D2 in the column direction. Therefore, the coupling portion c1 and the coupling portion c2 are appropriately stacked.

Similarly to FIG. 8B, the edge E2 of the metal line MT1 covers the edge E1 of the lead-out line D1, and a width of the coupling portion c1 of the lead-out line D1 in the column direction is larger than that of the coupling portion c2 of the metal line MT1 in the column direction. In addition, as illustrated in FIG. 8C, the lead-out line D0 is formed to cover the metal line MT0.

Figure 10:
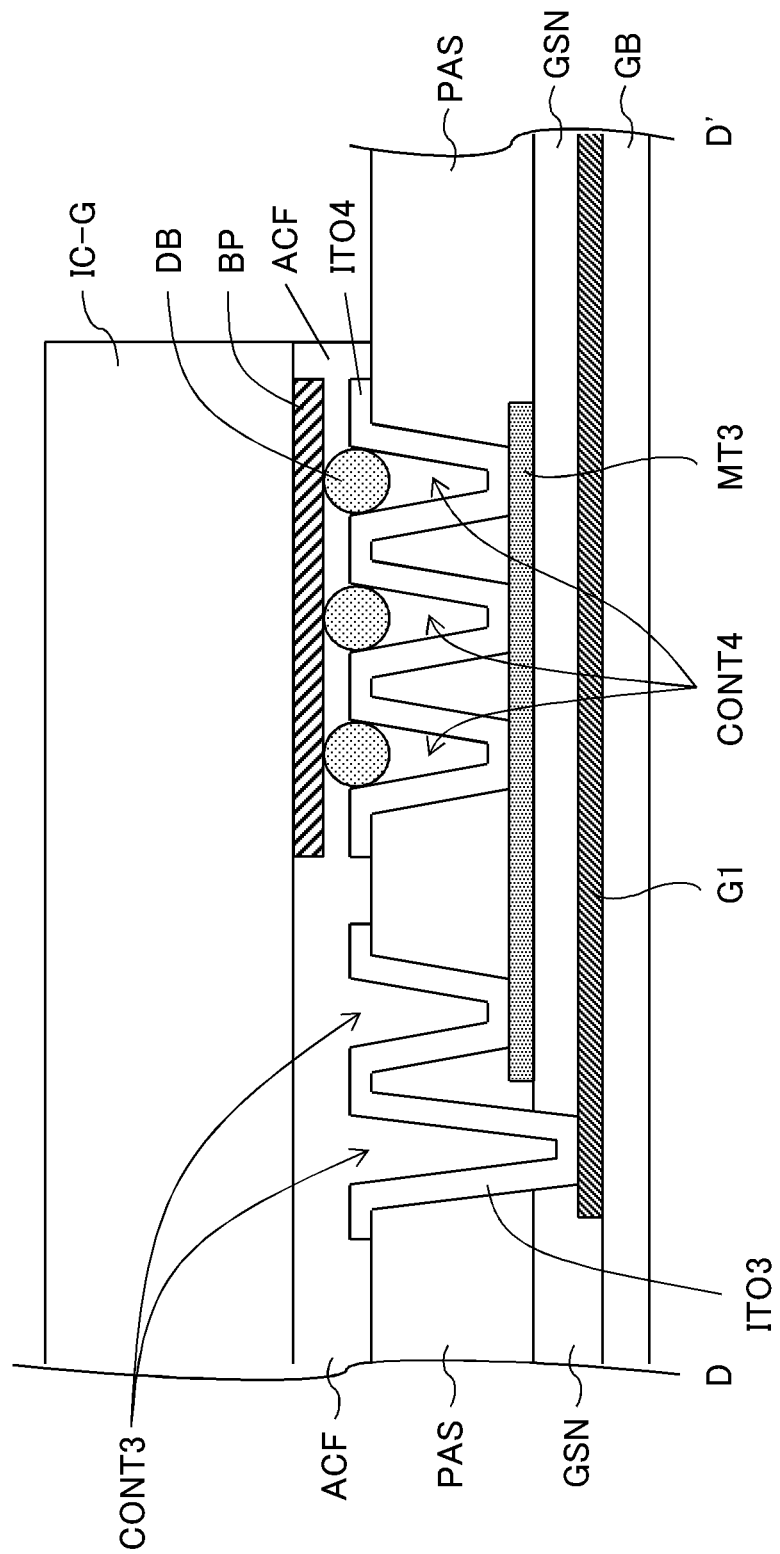
FIG. 10 is a cross-sectional view taken along Line D-D of FIG. 9.
Figure 11:
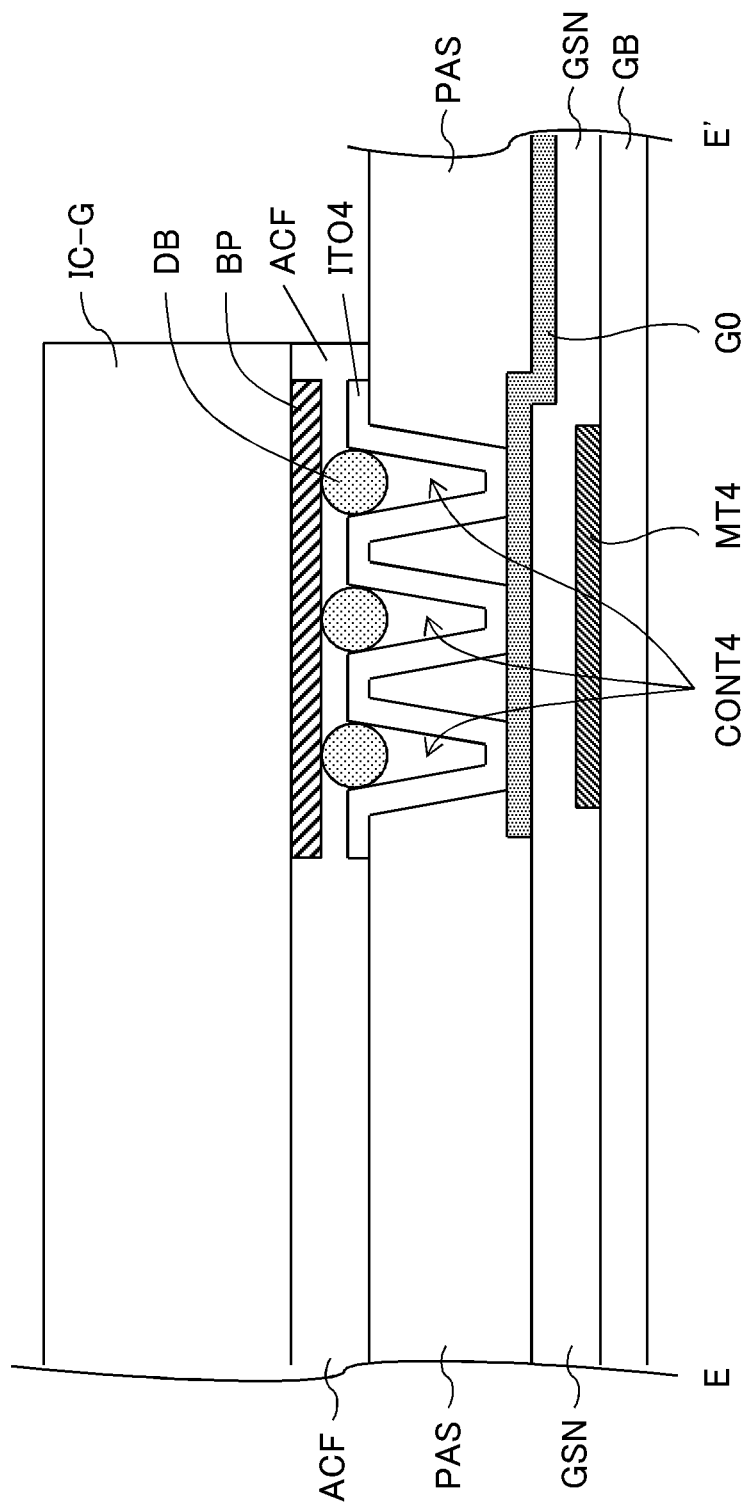
FIG. 11 is a cross-sectional view taken along Line E-E of FIG. 9.

Next, a specific configuration of the gate driver IC-G will be described. FIG. 9 is a plan view illustrating a configuration of a gate driver IC-G. FIG. 10 is a cross-sectional view taken along Line D-D of FIG. 9. FIG. 11 is a cross-sectional view taken along Line E-E of FIG. 9.

As illustrated in FIG. 9, the gate driver IC-G is provided with the input terminal portion IN and the output terminal portion OUT. The input terminal portion IN, for example, is connected to the FPC. The output terminal portion OUT is connected to lead-out lines G0 and G1. The lead-out line G1 is connected to the gate bus line which is connected to the shift register SR in the frame area. The lead-out line G1 and the gate bus line may be formed in the same layer (the gate layer) and directly connected to each other, or may be connected via the metal line.

The lead-out line G0, for example, is a power source line which does not contribute to displaying. The lead-out line G0 and the lead-out line G1 are formed in layers different from each other. Specifically, the lead-out line G1 is formed in the same layer (the gate layer) as the gate bus line and the gate line GL, and the lead-out line G0 is formed in the same layer (the drain layer) as the data line DL. The insulating layer GSN (the first insulating layer) is formed between the lead-out line G1 and the lead-out line G0.

Next, a connection structure of the gate driver IC-G will be described. First, a configuration of the output terminal portion OUT related to Cross Section D-D will be described using FIG. 10. In the TFT substrate SUB1, the lead-out line G1 which is present in the same layer as the gate line GL is formed on the glass substrate GB. The insulating layer GSN is formed so as to cover the lead-out line G1. A metal line MT3 which is present in the same layer as the data line DL is formed on the insulating layer GSN. The insulating layer PAS (the second insulating layer) is formed so as to cover the metal line MT3. While not illustrated in FIG. 10, the pixel electrode PIT is formed on the insulating layer PAS of the image display area DIA.

Under the gate driver IC-G, that is, in an area (the projection area) of the TFT substrate SUB1 overlapping the gate driver IC-G in planar view, a contact hole CONT3 (a first contact hole) is formed in the insulating layer GSN and the insulating layer PAS. A transparent electrode ITO3 (a first transparent electrode) is formed in the contact hole CONT3. With this contact hole, the lead-out line G1 and the metal line MT3 are electrically connected to each other.

In addition, a contact hole CONT4 (a second contact hole) is formed in the insulating layer PAS, and a transparent electrode ITO4 (a second transparent electrode) is formed in the contact hole CONT4. Parts of conductive particles DB contained in an anisotropy conductive film ACF come in contact with the transparent electrode ITO4, and a bump BP (for example, gold) of the gate driver IC-G comes in contact with other parts of the conductive particles DB. With this configuration, the metal line MT3 and the output terminal portion OUT of the gate driver IC-G are electrically connected to each other. The lead-out line G1 stretches to the image display area DIA, and is electrically connected to the gate bus line in the outside of the projection area.

As described above, in the output terminal portion OUT of FIG. 10, the lead-out line G1 and the output terminal portion OUT of the gate driver IC-G are electrically connected to each other via the metal line MT3, and the lead-out line G1 is electrically connected to the gate bus line. Therefore, the output voltage which is output from the gate driver IC-G is input to the shift register SR via the lead-out line G1. Further, the lead-out line G1 and the gate bus line may be connected via the contact hole, or may be connected via a metal line (ITO) which covers the both lines. In addition, the gate driver IC-G and the TFT substrate SUB1 are connected by the anisotropy conductive film ACF (resin adhesive). The transparent electrodes ITO3 and ITO4 are covered with a resin material of the anisotropy conductive film ACF in the projection area. Therefore, it is possible to prevent the transparent electrodes ITO3 and ITO4 from being corroded.

In the configuration illustrated in FIG. 10, the contact hole CONT3 (a contact area) is provided under the gate driver IC-G (in the projection area) to perform conversion (layer conversion) from the drain layer in which the metal line MT3 is formed to the gate layer in which the lead-out line G1 is formed. In other words, as illustrated in (b) of FIG. 7 in planar view, the contact area for the layer conversion is provided in the projection area of the gate driver IC-G. Therefore, according to the liquid crystal display device LCD, the liquid crystal panel can be formed in a narrow frame compared to the liquid crystal display device (for example, see (a) of FIG. 7) in which the contact area is provided in the outside of the projection area of the gate driver IC-G.

In the output terminal portion OUT related to Cross Section E-E illustrated in FIG. 11, the lead-out line G0 does not contribute to displaying, so that there is no need to perform the layer conversion. Therefore, the configuration illustrated in FIG. 11 can be made similarly to that in FIG. 5. In addition, similarly to the metal line MT0 of FIG. 5, a metal line MT4 is provided to make the lead-out line G0 (see FIG. 11) flush with the metal line MT3 (see FIG. 10).

Figure 12A:
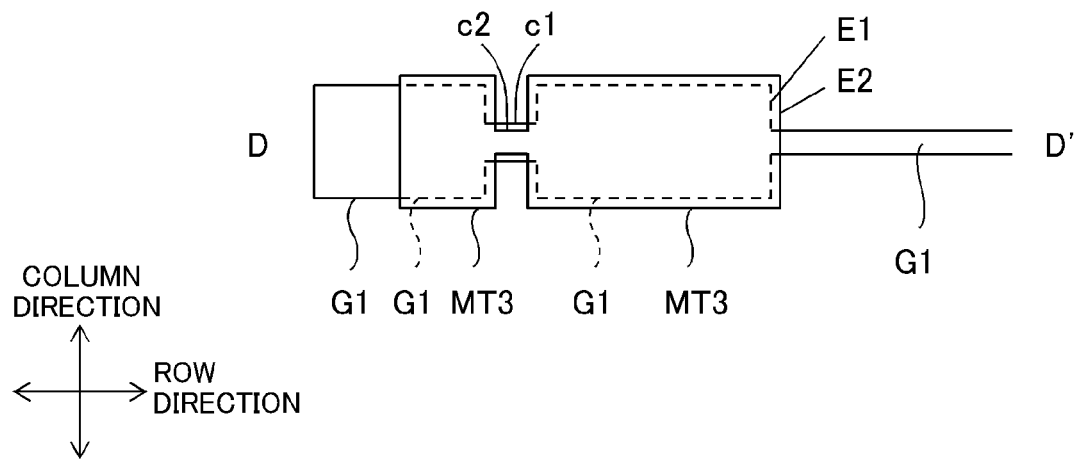
FIG. 12A is a plan view illustrating a configuration of an output terminal portion of FIG. 10.
Figure 12B:
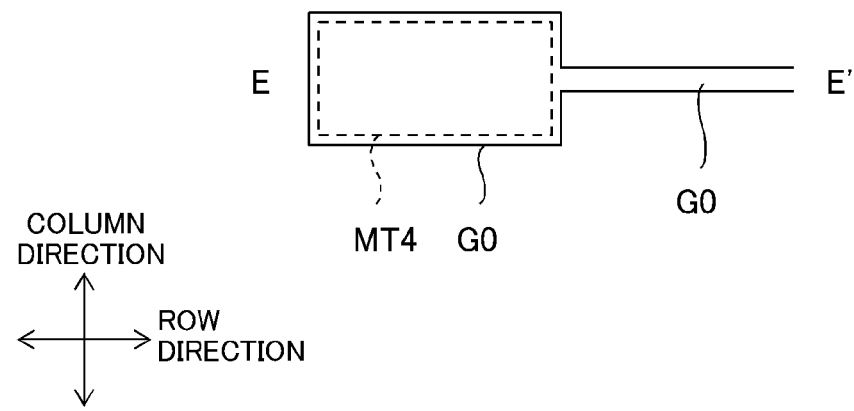
FIG. 12B is a plan view illustrating a configuration of an output terminal portion of FIG. 11.

Herein, a relation of widths of the lead-out lines G1 and G2 will be described. FIG. 12A is a plan view illustrating the lead-out line G1 and the metal line MT3 which correspond to the output terminal portion OUT related to Cross Section D-D illustrated in FIG. 10. FIG. 12B is a plan view illustrating the lead-out line G0 and the metal line MT4 which correspond to the output terminal portion OUT related to Cross Section E-E illustrated in FIG. 11.

In FIG. 12A, when viewed from the gate driver IC-G (upper side), the metal line MT3 arranged on a near side is depicted with a solid line; a portion of the lead-out line G1 which is arranged on a deep side to be overlapped with the metal line MT3 is depicted with a dotted line, and a portion not to be overlapped with the metal line MT3 is depicted with a solid line. The insulating layer GSN which is arranged between the lead-out line G1 and the metal line MT3 is not illustrated. As illustrated in FIG. 12A, the edge E2 of the metal line MT3 covers the edge E1 of the lead-out line G1, and a width of the coupling portion c1 of the lead-out line G1 in the column direction is larger than that of the coupling portion c2 of the metal line MT3 in the column direction.

Therefore, the coupling portion c1 and the coupling portion c2 are appropriately stacked. In addition, as illustrated in FIG. 12B, the lead-out line G0 is formed to cover the metal line MT4.

Hereinbefore, the embodiment of the invention has been described, but the invention is not limited to the above embodiment. Further, it is a matter of course that a person skilled in the art can obtain modifications by appropriately changing the above-mentioned embodiments in a scope not departing from the spirit of the invention, all of which are also included in the technical scope of the invention. For example, as described in the beginning, the display device according to the invention may be the organic EL display device. In addition, a semiconductor layer used in the TFT substrate (the first substrate) may be formed of amorphous silicon, low-temperature poly-silicon, or oxide semiconductors.

In such a configuration of the display device according to the embodiment, the contact area for connecting the metal line and the lead-out line is provided in an area (the projection area of the driving circuit) overlapping the driving circuit in the first substrate. Therefore, the display panel can be formed in a narrow frame.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
a first substrate configured to be disposed on a rear surface side; and
a second substrate configured to be disposed on a display screen side, wherein
the first substrate and the second substrate are arranged opposite to each other,
the first substrate includes a plurality of first signal lines which are arranged in an image display area and a plurality of driving circuits which drive the plurality of first signal lines,
the driving circuit comprises a first bump and a second bump,
the first bump is electrically connected to a first metal line which is formed in the first substrate,
the first metal line is electrically connected via a contact hole to a first lead-out line which is electrically connected to one of the plurality of first signal lines,
the second bump is electrically connected via a contact hole to a second lead-out line which is electrically connected to another of the plurality of first signal lines,
the first lead-out line is formed in a layer different from that of the first metal line in the first substrate while the second lead-out line is formed in a same layer as that of the first metal line in the first substrate,
the first metal line and the second lead-out line are formed in the same layer as the plurality of first signal lines,
the first lead-out line is formed in the same layer as a plurality of second signal lines, and
the plurality of first signal lines are data lines, and the plurality of second signal lines are gate lines.

2. The display device according to claim 1, wherein
the first metal line is electrically connected to the first lead-out line via a first contact hole which is formed in an area of the first substrate overlapping the driving circuit in planar view, and
the first bump is electrically connected to the first metal line via a second contact hole which is formed in the area.

3. The display device according to claim 1, wherein
the first lead-out line is formed on a glass substrate of the first substrate,
a first insulating layer is formed so as to cover the first lead-out line,
the first metal line is formed on the first insulating layer,
a second insulating layer is formed so as to cover the first metal line,
the first contact hole is formed in the first insulating layer and the second insulating layer,
the second contact hole is formed in the second insulating layer,
the first metal line and the first lead-out line are electrically connected via a first transparent electrode which is formed in the first contact hole, and
the first metal line and the first bump are electrically connected via a second transparent electrode which is formed in the second contact hole.

4. The display device according to claim 3, wherein
the first transparent electrode and the second transparent electrode are covered with a resin adhesive to connect the driving circuit to the first substrate in the area.

5. The display device according to claim 1, wherein
a plurality of the first and second lead out lines are present, and the first lead-out lines and the second lead-out lines are formed alternately in two layers which are different from each other, and
an insulating layer is formed between the layer of first lead-out lines and the layer of the second lead-out lines.

6. The display device according to claim 2, wherein
the second contact hole is formed at a position near the image display area from the first contact hole.

7. The display device according to claim 4,
wherein the resin adhesive has conductive particles, and
wherein at least a part of the conductive particle is present within the contact hole.

* * * * *